United States Patent [19]

Ryon et al.

[11] Patent Number: 5,026,044
[45] Date of Patent: Jun. 25, 1991

[54] DUAL MODE DOCUMENT REGISTRATION SYSTEM

[75] Inventors: Randall C. Ryon, Fairport; Lamia K. Canal; Donald R. Tickner, both of Rochester, all of N.Y.

[73] Assignee: Xerox Corporation, Stamford, Conn.

[21] Appl. No.: 546,984

[22] Filed: Jul. 2, 1990

[51] Int. Cl.[5] .................................... B65H 9/00
[52] U.S. Cl. .................................. 271/227; 271/233; 271/301; 271/902
[58] Field of Search ............... 271/225, 227, 233, 239, 271/301, 902

[56] References Cited

U.S. PATENT DOCUMENTS

| | | | |
|---|---|---|---|
| 3,510,125 | 5/1970 | Krueger et al. | 271/10 |
| 4,285,512 | 8/1981 | Shlatz | 271/233 |
| 4,455,018 | 6/1984 | Golglazier et al. | 271/227 |
| 4,508,444 | 4/1985 | May et al. | 355/3 R |
| 4,579,444 | 4/1986 | Pinckney et al. | 355/14 SH |
| 4,713,674 | 12/1987 | Giezeman et al. | 355/14 SH |
| 4,731,637 | 3/1988 | Acquaviva | 271/227 X |
| 4,791,451 | 12/1988 | Hirose et al. | 355/8 |
| 4,817,933 | 4/1989 | Honjo et al. | 271/3.1 |
| 4,864,366 | 9/1989 | Saeki | 271/233 X |

OTHER PUBLICATIONS

Xerox Disclosure Journal, vol. 3, No. 2, Mar./Apr., 1978, pp. 123-125, T. N. Taylor.
Xerox Disclosure Journal, vol. 7, No. 4, Jul./Aug., 1982, p. 275.
Xerox Disclosure Journal, vol. 8, No. 3, May/Jun. 1983, p. 263.

*Primary Examiner*—Richard A. Schacher

[57] ABSTRACT

A system for efficiently feeding normal sized and oversized documents into different imaging positions overlying an imaging platen. All documents are initially fed onto the platen from an infeeding position desirable for normal documents substantially downstream from the upstream end of the platen. A normal document is only fed unidirectionally downstream into an imaging position. A sensed oversized document is initially fed downstream, but then, after its trail edge has cleared the infeeding position, it is reverse fed towards the upstream end of the platen into a imaging position partially overlying the normally unused upstream portion of the platen. A baffle normally directly overlies that area of the platen. During the initial reverse movement of an oversized document has baffle is pivoted upwardly at its downstream edge, at the infeeding position, to provide a document guide surface under the baffle. The baffle is then lowered onto that portion of the oversized document now extending thereunder before its imaging to provide an imaging background surface, and may be raised again for downstream ejection of the overiszed document. For normal documents the baffle may remain flat on the platen.

15 Claims, 4 Drawing Sheets

DUAL MODE DOCUMENT REGISTRATION SYSTEM

In accordance with my invention there is disclosed herein an improvement in document imaging systems, and more particularly to a dual mode system and document handling apparatus for document registration which switches automatically to a different system or mode of document registration for oversized documents. Additional features relate to the specific embodiment disclosed herein.

In particular, there is disclosed a dual mode document registration system in which normal size documents to be stationarily imaged on an imaging platen are desirably fed into registration unidirectionally in a normal document feeding direction, whereas oversize documents are automatically registered in a different, bidirectional, manner. That registration may be based on the lead edge or trail edge position of the document.

Preferably the oversize documents are initially fed in the same direction as the normal size documents, until their trailing edge is sensed, then automatically reverse fed for a short distance in the reverse direction, in which reverse direction the oversize document trail edge is reverse fed back into a registration position on an extension area of the platen, preferably under a document input area. This oversize document registration is preferably based on the trailing edge of the document.

To express it another way, there is disclosed herein a low cost and simple system providing a dual mode registration document handler, which document handler has a special, different, mode of operation for large documents, e.g., A3 or 11"×17" documents.

The disclosed document handler is preferably, as shown, of a dual document entrance type, such as an RDH/SADH, and this special mode for large documents is operative for documents being fed into the side document entrance or SADH slot of the document handler. [RDH/SADH is a common abbreviation for a well known type of document handler with a top loading recirculating document handler (RDH) and an integral alternative input providing a semi-automatic document handler (SADH) unidirectional input at one side thereof.]

The disclosed system of automatic document registration allows a smaller RDH to be used, with a smaller overall document recirculation path for normal size documents, on a larger platen, large enough to allow full imaging of substantially larger documents thereon, yet which larger documents are also automatically, rather than manually, fed and registered on the same platen.

The disclosed system of automatic document registration allows documents to be fed onto a large area imaging platen at an infeeding position substantially downstream of the upstream end area of the large platen, to provide a shorter undirectional path for normal sized documents, yet can utilize the full area of the large platen, including said upstream end area, to stationarily image large documents thereon.

The subject specific embodiment illustrates document feeding and registration for electronic document imaging, for ultimate electronic printing of the electronic page images after electronic storage and processing and page reordering, rather than a conventional light lens optical imaging copier system, as in most of the art cited herein. An example of such an electronic document imaging and printing system is disclosed in Xerox Corporation U.S. Pat. No. 4,757,348 issued July 12, 1988 to Rourke, et al. That U.S. Pat. No. 4,757,348 also discloses bar coded document control sheets or job tickets, and bar code reading and discrimination and copying controls. That is compatibly usable with the present system, if desired. Among many examples of platen scanning electronic imaging systems per se are Xerox Corporation U.S. Pat. No. 4,295,167 or related U.S. Pat. No. 4,287,536. The present invention is applicable to document handling for either system, an electronic scanner or a copier imaging input. Thus, the terms copying and imaging are used interchangeably in this particular case.

Various types of document registration systems are known in the art, as further discussed herein, and as disclosed in exemplary patents cited herein. In particular, art noted as of interest to the subject document registration system includes Shaltz U.S. Pat. No. 4,285,512 re feeding a document onto a platen then reversing its direction to place the trailing edge in a registration position without a mechanical gate. Ide U.S. Pat. No. 4,793,983 provides a similar function but using a mechanical registration gate. Noted also was Colglazier U.S. Pat. No. 4,455,018, noting especially Col. 3, lines 29-40, and Hirose U.S. Pat. No. 4,791,451, both sensing an edge or size of a document and establishing a document registration position on the platen therefrom. Of background interest were noted U.S. Pat. Nos. 4,713,674 and 4,817,933.

Also as to specific hardware components of the subject apparatus, it will be appreciated that, as is normally the case, various such specific hardware components are known per se in other apparatus or applications, including that described in art cited herein, and need not be re-described herein. Particularly noted is the servo driven document platen transport belt and registration system of Xerox Corporation U.S. Pat. No. 4,579,444, issued Apr. 1, 1986 to Pinckney and Sanchez, and art cited therein, and the corresponding Xerox Corporation "1065" copier RDH. Also particularly noted is the SADH entrance 21 on the left hand side of the cover page figure of said U.S. Pat. No. 4,579,444. Said '444 patent is of appropriate background interest as illustrating the general nature of the specific embodiment of the disclosed document handler and platen. The system for handling oversized documents described in said U.S. Pat. No. 4,579,444 (e.g., Col. 23 paragraph one) is, however, as may be seen, quite different from that of the subject invention. The infeeding baffle or feed-on flap is somewhat similar that shown in Xerox Disclosure journal (XDj) Vol. 7, No. 4., July/August 1982, p. 275.

Further background prior art noted in addition to said U.S. Pat. No. 4,579,444 patent includes Xerox Corporation U.S. Pat. No. 4,508,444, issued Apr. 2, 1985, to Joseph May. However, that is a reversible CVT or constant velocity transport document handling system in which the document is slit scanned by moving the document over a narrow imaging platen, rather than allowing the entire document to overly a single large platen, on which platen the document may be imaged while the document is stationary, as here.

An additional reference noted is Xerox Disclosure journal Vol. 3, No. 2, March/April 1978, page 123-125, to Thomas N. Taylor. This is a document registration system in which a minor lead edge portion of the document is driven out slightly beyond the downstream edge of the platen by the platen transport until it engages a switch 6 there which then actuates reversible movement of the platen transport belt 3, slowly, to back the document by a fixed distance into the registration position for the platen. However, this XDj system provides downstream registration adjacent a downstream edge of the platen in the primary direction of document movement, not trail edge registration of the document to an upstream registration edge of the platen. There is no distinction between the registration mode of normal and oversize documents in that system.

This XDj publication and said U.S. Pat. No. 4,579,444 reference both point out the undesirability and disadvantages of using fixed gate or stop finger registration systems into which a document is driven or impacted. By way of background, "back-up" registration with a reversing belt into such a fixed document registration edge or gate is covered in Xerox U.S. Pat. No. 3,510,125, issued May 5, 1970 to J. R. Krueger, A. Howard, and G. Fackler. These disadvantages include difficult requirements for controlled slippage between the document transport belt and the document at registration. These and other references teach the desirability of the present system in providing non-slip engagement of the platen transport belt with the document, and document registration by a controlled stopping position of the transport belt holding the document, rather than by mechanical gates, fingers, or edge stops engaging and stopping the document.

As noted in the prior art, as xerographic and other copiers increase in speed, and become more automatic, it is increasingly important to provide higher speed yet more reliable and more automatic handling of the document sheets being copied, i.e. the input to the copier. Even with slower copying rate copiers, it has become increasingly desirable to provide an automatic document handler (ADH) or feeder (ADF) for automatic feeding from a stack of documents, with the document handler providing all the deskewing, feeding and final registration of the documents into the copying position, and then ejecting the documents from the platen automatically. It is desirable to reliably feed and accurately register for copying document sheets of a variety or mixture of sizes, types, weights, materials, conditions and susceptibility to damage.

Original document handling, particularly for delicate, valuable, thick or irregular documents, is often more difficult and critical than feeding plain paper sheets. The images on documents (and/or their fusing if they are themselves copies), can change the sheet feeding characteristics. These document images may be subject to damage in feeding if non properly handled, especially of freshly typed typewriting ink, ink jet printer ink, etc.. Original documents can vary widely in sheet size, weight, thickness, material, condition, humidity, age, etc.. Documents may have curls, wrinkles, tears, "dogears", cut-outs, overlays, tape, paste-ups, punched holes, staples, adhesive, or slippery areas, or other irregularities. Unlike copy sheets, which generally are from the same new clean batches and are therefore of the same general conditions and size, documents can often vary considerably even if they are all of the same "standard" size, e.g., letter size, legal size, A-4, B-4, etc. Documents, even in the same document set, may have come from different paper batches or have variably changed size with different or humidity conditions, different imaging or fusing, etc.. Yet it is desirable to automatically or semi-automatically rapidly feed, register and copy even a mixture of sizes, types, and conditions of documents without document jams or document damage and with each document correctly and accurately aligned to a desired registration position on the imaging platen.

As noted in the prior art, one of the most difficult to achieve features for automatic document handling is the rapid, accurate, reliable, and safe registration of each document at the proper position for copying. Conventionally the document is desirably either center-registered or corner-registered (depending on the copier) by the document handler automatically at a pre-set registration position relative to the copier platen. At this registration position two orthogonal edges of the document are aligned with two physical or positional (imaginary) registration lines of the copier platen at which the original document is properly aligned with the copier or electronic scanner optics for correct imaging of the document image. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents. As noted in the above-cited Xerox Corporation U.S. Pat. No. 4,579,444, the desired registration (imaging) position of a document may desirably vary with document size in some cases.

A preferred type of copier document handling system is one that can utilize an existing or generally conventional copier optical imaging system. That is, utilizing the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. Preferably in document handling systems the document is automatically registered for copying overlying a selected portion of full-sized (full-frame) platen which is at least as large as the largest document to be normally copied. In such systems the document is preferably either scanned or flashed while it is held stationary on the platen in the desired registration position. In these full-frame systems the document is preferably registered by being stopped and held during imaging at a preset registration position over the platen glass which is adjacent one side or edge thereof.

As shown in the art and discussed herein, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transports are known with various registration devices or systems. Preferably the same platen transport sheet feeder is used to drive a document onto and off of the platen before and after copying, as well as registering the document.

As noted, since forward edge-registration by mechanical or "hard" stopping of the document edge against a mechanical edge, finger or gate is known to be undesirable, other systems have been developed, as shown in the art. As shown in the above-cited Xerox Corporation U.S. Pat. No. 4,579,444 or 4,621,801, art cited therein, etc., document registration can desirably be done without such mechanical document stops on the platen. This can be done by pre-registering the document to a platen transport belt with an upstream, off-platen, pre-registration document edge sensor, fingers or rollers, and then moving the document a known, preset, distance over the platen on the belt into registration, providing there is no slippage during this entire movement between the document and the belt, i.e., stopping the document platen transport after a preset time period or movement to stop the document on the platen.

Integral side or lateral registration and side edge deskewing of the document is known to be highly desirable. However, such lateral or second axis (side edge) document registration is known to preferably be done upstream of the platen. The present system desirably provides this for all copying modes.

Some other current examples of prior art recirculating document handlers are disclosed in U.S. Pat. Nos. 4,076,408; 4,176,945; 4,278,344; 4,330,197, 4,466,733; and 4,428,667.

In the description herein the term "document" or "sheet" refers to a usually flimsy sheet of paper, plastic, or other such conventional individual image substrate, and not to microfilm or electronic images which are generally much easier to manipulate. The "document" is the sheet (original or previous copy) being imaged, or copied in the copier onto the "copy sheet", which may be abbreviated as the "copy". Related, e.g., page order, plural sheets of documents or copies are referred to as a "set". A "simplex" document or copy sheet is one having its image and page number on only one side or face of the sheet, whereas a "duplex" document or copy sheet has "pages", and normally images, on both sides, i.e., each duplex document and copy is considered to have two opposing sides, faces, or "pages" even though no physical page number may be present.

A specific feature of the specific embodiment disclosed herein is to provide a document feeder for feeding both normal sized and oversized document sheets into imaging positions overlying an imaging platen from a document infeeding entrance position substantially downstream from the effective upstream end of said imaging platen, with sensing means for sensing the input of a document which is oversized in the direction of movement thereof, comprising bi-directional platen transport means for feeding normal sized documents undirectionally downstream from said document infeeding entrance position over said imaging platen into an imaging position overlying said imaging platen, and for initially also so feeding oversized documents downstream, but then, in response to said sensing means sensing that it is an oversized document, and after the trail edge of said oversized document has cleared said document infeeding entrance position, reversing said bi-directional platen transport means to reverse feed said oversized document upstream towards said upstream end of said imaging platen into a special registration and imaging position for oversized documents which is partially overlying at least a portion of said imaging platen between said document infeeding position and said upstream end of said imaging platen.

Further specific features provided by the system disclosed herein, individually or in combination, include those wherein said special imaging position of said oversized document is adjacent said upstream end of said imaging platen, and wherein in response to the completion of imaging of either said normal sized or said oversized document sheets said bi-directional platen transport means is operated to feed the documents sheets downstream to eject them from the downstream end of said imaging platen, and wherein a pivotable baffle overlies an area of said imaging platen between said document infeeding entrance position and said upstream end of said imaging platen, which baffle is initially adjacent and generally coplanar said imaging platen for document input through said document infeeding entrance position, and for document imaging, but which baffle is automatically temporarily pivoted upwardly at at least its downstream edge by connecting baffle pivoting means in response to a sensed oversized document during at least said initial reverse movement of said oversized document so that as said oversized document is being reverse fed upstream towards said upstream end of said imaging platen into said special registration position it is fed partially under said baffle, and then said baffle is lowered onto that position of said oversized document thereunder before its imaging by said baffle pivoting means and/or wherein said pivotable baffle is automatically raised again temporarily by said baffle pivoting means for downstream document ejection of said oversize document after its imaging, so as not to substantially drag on said oversize document as said oversize document is being removed and/or wherein said pivotable baffle is not pivoted for normal sized documents, and said baffle stays down flat directly on top of said area of said platen it overlies at all times for said normal sized documents.

Further features disclosed herein include a method of feeding both normal sized and oversized documents to be imaged into an imaging portion overlying an imaging platen, wherein both the normal sized and oversized documents are initially fed onto the imaging platen from a document infeeding entrance position substantially downstream from the upstream end of the imaging platen, and a normal sized document is fed unidirectionally downstream from the document infeeding entrance position over the imaging platen into an imaging position overlying an imaging platen, oversized documents are initially fed downstream from the document infeeding position over the imaging platen, but then, in response to sensing that it is an oversized document, and after the trail edge of the oversized document has cleared the document infeeding entrance position, the oversized document is then reverse fed upstream towards but not beyond the upstream end of the imaging platen into a special imaging position for oversized documents which is partially overlying at least a portion of the imaging platen between the document infeeding position and the upstream end of the imaging platen, and/or wherein after the documents are imaged they are fed downstream and ejected from the downstream end of the imaging platen, and/or wherein in said initial feeding downstream from the document infeeding position over the imaging platen of said oversized documents a portion thereof is fed beyond from the downstream end of the imaging platen before the oversized document is reverse fed upstream towards the upstream end of the imaging platen, and/or wherein an oversized document is initially fed in the same manner as a normal size document, until the trailing edge of that document is sensed at a time period following the sensing of the leading edge exceeding a preset time period corresponding to an oversize document; and/or wherein said document feeding is done by a dual mode automatic document feeder in which normal sized documents are normally loaded into a circulating loop path document set input thereof and oversized documents are loaded into a separate document input with a generally planar document path but both said document inputs feed documents onto the imaging platen from said common document infeeding entrance position substantially downstream from the upstream end of the imaging platen; and/or wherein a pivotable baffle overlies an area of the imaging platen between the document infeeding entrance position and the upstream end of the imaging platen, which baffle is initially adjacent and generally coplanar the imaging platen for document input through the document infeeding entrance position, and for document imaging, but which baffle is temporarily pivoted upwardly at at least its downstream edge in response to a detected oversized document during at least the initial reverse movement of the oversized document so that as the oversized document is being reverse fed upstream towards the upstream end of the imaging platen into said special registration position it is fed partially under the baffle, and then the baffle is lowered onto that portion of the oversized document thereunder before its imaging; and/or wherein the pivotable baffle is again raised temporarily for downstream document ejection of the oversize document after its imaging, so as not to substantially drag on the oversize document as the oversize document is being removed; and/or wherein the pivotable baffle is not pivoted for normal sized documents, and the baffle stays down flat directly on top of the area of the platen it overlies at all times for normal sized documents; and/or wherein both normal sized and oversized documents are transported over said imaging platen by a large platen transport and imaging background belt and normal sized documents are imaged fully overlaid by said platen transport belt but oversized documents are imaged only partially overlaid by said platen transport belt.

The disclosed apparatus may be readily operated and controlled in a conventional manner with conventional control systems. Some additional examples of control systems for various prior art copiers with document handlers, including sheet detecting switches, sensors, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in general, and preferable, to program and execute such control functions and logic with conventional software instructions for conventional microprocessors. This is taught by the above and other patents and various commercial copiers. Such software will of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems. As shown in the above-cited art, the control of exemplary document and copy sheet handling system in copiers may be accomplished by conventionally actuating them by signals from the copier controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc.. The resultant controller signals may conventionally actuate various conventional electrical solenoid or cam-controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Known copying systems utilize such conventional microprocessor control circuitry with such connecting switches and sensors for counting and comparing the numbers of document and copy sheets as they are fed and circulated, keeping track of their positions, counting the number of completed document set circulations and completed copies, etc., and thereby controlling the operation of the document and copy sheet feeders and inverters, etc.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example(s) below, as well as the claims. Thus the present invention will be better understood from this description of an embodiment thereof, including the drawing figures (approximately to scale) wherein:

Describing now in further detail the exemplary embodiment with reference to the Figures, there is shown a dual mode document handling and imaging system 10 with a document handler 20 by way of one example of the invention. As noted, this may be utilized for either electronic imaging for a printer, with an electronic image scanning system 11 as illustrated, or for a copier, by using conventional copier optics. Disclosed is a dual mode document registration document handler 20, which has a special, different mode of operation for large documents, e.g., 11"×17" or A3 documents. These large documents are preferably fed into the side entrance or SADH slot 22 of the document handler 20, as compared to normal size documents which may be inserted either there or in the top or RDH stacking tray 21.

The illustrated exemplary document handler 20 is an dual input RDH/SADH unit very much like that shown in the above-cited Xerox U.S. Pat. No. 4,579,444, issued Apr. 1, 1986, although FIG. 1 there is a reversed, mirror image, or rear view. Thus this RDH/SADH 20, including its exemplary side or SADH entrance 22, may be basically as described in that patent, except as to the novel aspects described herein. Likewise, the RDH/SADH 20 and its drives and sensors are conventionally connected to and controlled by a conventional programmable controller 100, programmed as described herein.

That SADH entrance 22 path feeds documents out to the upstream end of the platen transport belt 24 and onto the platen 30 at an infeeding position 25 there. This infeeding position 25 at which the document is initially fed onto the platen 30 and acquired in the nip therewith of the platen transport belt 24 is substantially upstream of the effective upstream end 30a of the platen 30. Just upstream of this document infeeding position 25 here is a conventional document edge optical sensor 29 (corresponding to reference 31 in the cited U.S. Pat. No. 4,579,444). An underlying pivotal infeeding area light reflective baffle 26, preferably liftable from its upstream end 26a by a solenoid 28 as will be latter described, closely overlays the platen 30 in the area thereof extending from the platen upstream edge 30a to the infeeding position 25. This infeeding area light baffle 26 is otherwise somewhat similar that shown and described in XDJ Vol. 7, No. 4., July/August 1982, p. 275.

Figure 1:
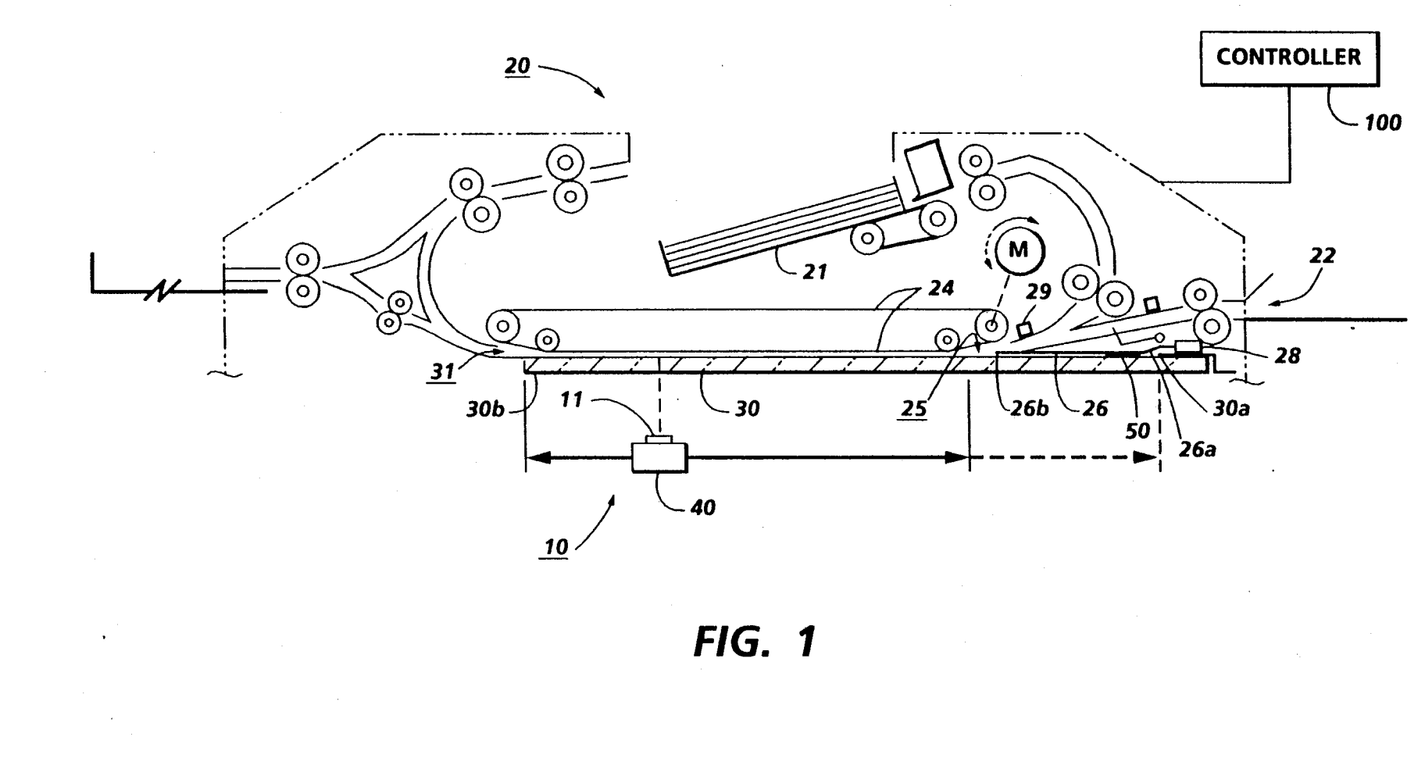
FIG. 1 is a schematic side view of one embodiment of the system of the invention, showing an exemplary RDH/SADH document handler and an exemplary electronic image scanning system therefor.

Disclosed here schematically in FIG. 1 is an exemplary electronic image scanning system 11 scanning from under the platen 30 with a scanner 40 which may be mounted on and reciprocally driven by a typical horizontal optical scanning carriage. The electronic image scanning system 11 here provides for scanning up to the full length or the entire area of the platen 30, (see the movement arrows) to be able to image a document of any size which can be fitted onto the platen 30 upper surface. Preferably, the particular scanning length or distance in any given scan is limited to the length of the particular document being scanned at that time, measured from the desired registration edge position, to avoid unnecessary overscanning and provide faster scanning of sequentially fed and registered documents. Conventionally a document illuminating lamp an reflector light source may be located on the same scanning carriage. The electronic imaging member 40 may be a conventional full width imaging bar or scan head array, preferably with an integral conventional lens strip such as well known Selfoc TM multi-element lens or fiber optics array, as in U.S. Pat. No. 3,977,777, for example. Such electronic digitizing of the document image, for integral or separate digital copying, printing, facsimile transmission, and/or other digital image processing, enhancement, and/or manipulation, is rapidly become more important and critical, as compared to conventional light lens optical input, or the like. This is sometimes called an "EFE" or "electronic front end". Above-cited examples included Xerox Corporation U.S. Pat. Nos. 4,757,348, 4,295,167 and 4,287,536. The electronic image scanning may be bidirectional, as is known for example from Eastman Kodak U.S. Pat. No. 4,150,873 issued Apr. 24, 1979 to G. Dali and Xerox Corporation U.S. Pat. No. 4,205,350. Also, various electronic buffer and page collation systems may be connected to or made a part of the EFE, as disclosed in above-cited references, IBM Corp. U.S. Pat. Nos. 4,099,254, or 4,213,694; Eastman Kodak Canadian 1,086,231 or UK 1 531 401; the Xerox Corporation "1200" and "9700" printers etc.

In the subject system, with document handler 20, normal sized documents are fed and registered and ejected entirely undirectionally on the platen 30, in a generally conventional manner, with the servo-driven non-slip platen transport belt 24. However, a large oversize, document (only) is initially fed onto the platen 30 in the same manner and direction but then is automatically treated differently, in accordance with being sensed as being oversized as it is fed in or as specified as oversized by the controller 100. The large document feeding continues until the downstream or lead edge area of the large document is overfed past the downstream end 30b of the platen (so that the lead edge area of the document actually briefly enters into the document exit or post-platen ejecting area 31). At that point in time, the trail edge of the oversized document has passed the upstream document edge sensor 29 and the downstream edge 26b of the baffle 26 in passing through the infeeding position 25 so that the length and oversized nature of that document is known by the copier or printer controller 100. An oversized document includes any document which, at the feed-in point, exiting the infeeding position 25, would have any portion thereof extending beyond the downstream edge 30b of the platen 30, and would be imaged that way if handled as a normal document.

In response to the oversize information, the document platen transport is automatically reversed (but preferably operated at a much slower reverse speed than the forward speed), and the documents is "backed-up" into a desired copying position registered relative to the upstream platen edge 30a. That same reverse document movement into the large document copying position moves the trail edge area of the large document back under the infeeding baffle 26, under and substantially past the SADH entrance path 22,24, towards the upstream edge 30a of the platen. The reverse document movement of the oversize document may be stopped may be stopped at a special registration position of, e.g, 4.45 mm from the manual registration position. That manual registration position is at 30a here, and is conventionally defined by the left edge of a conventional fixed manual registration edge strip member, which also defines the effective upstream platen edge 30a in this example. This special oversize document registration position allow for ample document positioning tolerances. This reverse feeding of the previously trailing edge of the oversized document is into the substantial upstream extension area of the platen extending upstream from the document infeeding position 25 and the platen transport 24 up to the upstream platen edge 30a (a distance of preferably more than 10 centimeters). Such a platen extension area per se is also shown in said U.S. Pat. No. 4,579,444 and the corresponding Xerox Corporation "1065" copier. However, there that upstream extension area of the platen is only available for manually placed documents.

It is desirable that the platen transport 24 be smaller and shorter than the platen 30, so as to have a shorter document recirculation loop path length to and from tray 21 for regular sized documents, yet not preclude feeding (rather than manual handling) of larger documents onto the platen 30 for imaging. This is provided here, as described. The disclosed system of automatic document registration allows a smaller RDH to be used, with a smaller overall document recirculation path for normal size documents, on a larger platen, large enough to allow full imaging of substantially larger documents thereon, yet which larger documents are also automatically, rather than manually, fed and registered on the same platen. The disclosed system of automatic document registration allows documents to be fed onto a large area imaging platen 30 at an infeeding position 25 substantially downstream of the upstream end 30a of the large platen 30, to provide a shorter unidirectionally path for normal sized documents, yet can utilize the full area of this large platen 30, including the extended platen area upstream of the infeeding position 25, to stationarily image large documents thereon.

It is important to note that the subject document handling system does not register normal size documents by backing them up under the document input area 25. Normal documents are registered by only unidirectionally feeding downstream into their normal registration position, completely under the wide document platen transport belt 24, as described in said U.S. Pat. No. 4,579,444, or otherwise. Trail edge based document registration is preferred in this example. The backing-up of a document, and the coordinated lifting of the baffle 26 downstream end 26b by solenoid 28 as described herein, is automatically actuated only for documents which are sensed or otherwise indicated as being oversized. All documents are feed in onto the platen 30 through the normal SADH or RDH input path guide baffles leading to input area 25, as shown, which baffles are above the baffle 26. The end of these document entrance baffles provides a document infeeding entrance position at the input area 25 which the trail edge of the documents must clear or exit.

A normal document only passes above, without normally contacting, the baffle 26. However, if desired, in that lowered or normal position the upper surface of the baffle 26 near downstream lip 26b may also provide a low friction guide surface to help guide a lead edge of an incoming document into the infeeding position 25 and into the nip between the platen transport 24 and the platen 30.

For normal sized documents the baffle 26 primarily provides a light baffle or uniform platen imaging light reflective background cover, as noted, to prevent "show around" shadow images outside of the normal sized document area during its imaging. The baffle 26 is preferably a thin lightweight and generally planar light reflective member underlying the document infeeding area 22,25 and overlying the above-described upstream platen extension area.

Figure 2:
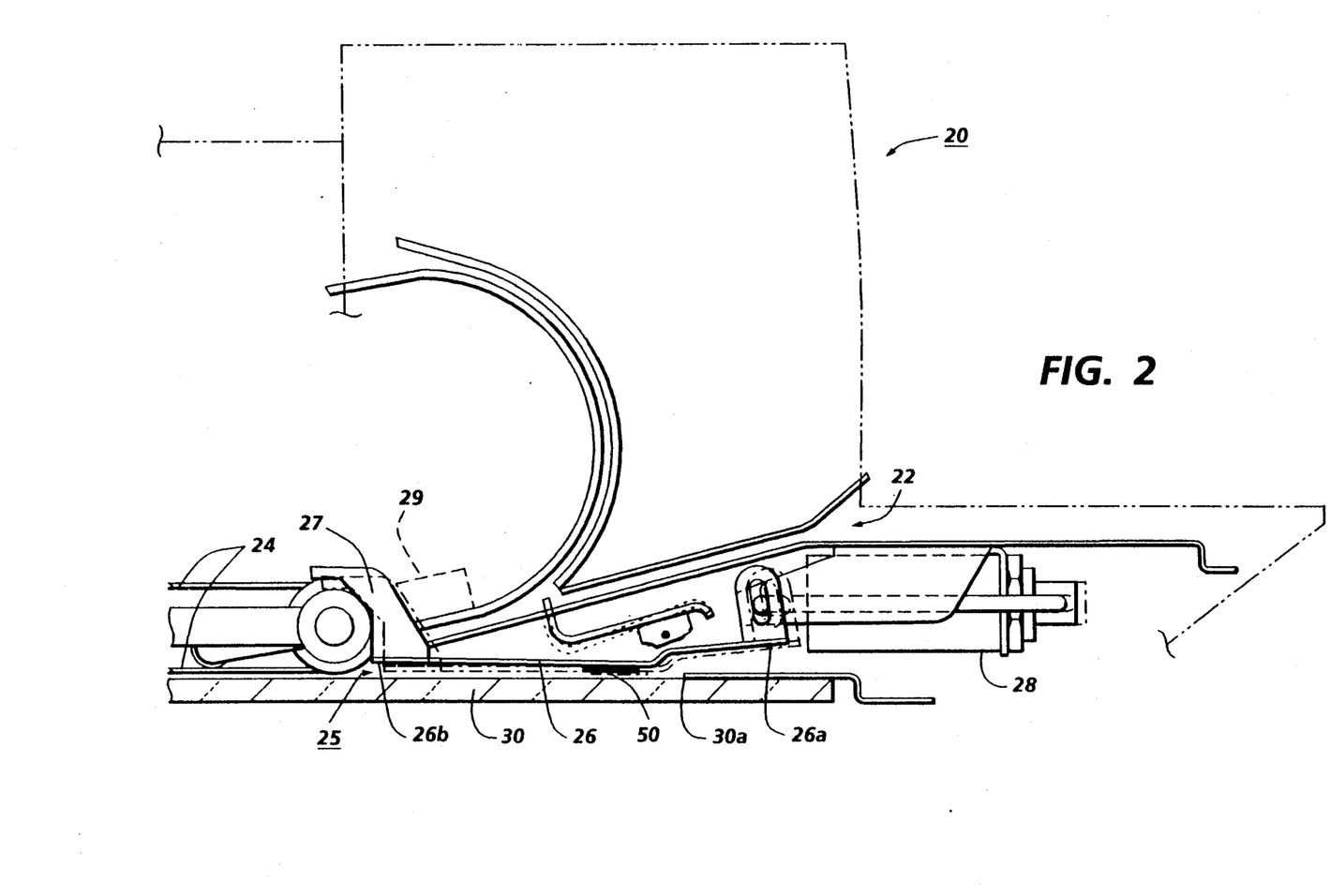
FIG. 2 is an enlarged view of the right hand portion of the document handler of FIG. 1 illustrating the SADH document input area pivotal baffle system for reverse feeding of oversize documents in the illustrated raised position.
Figure 3:
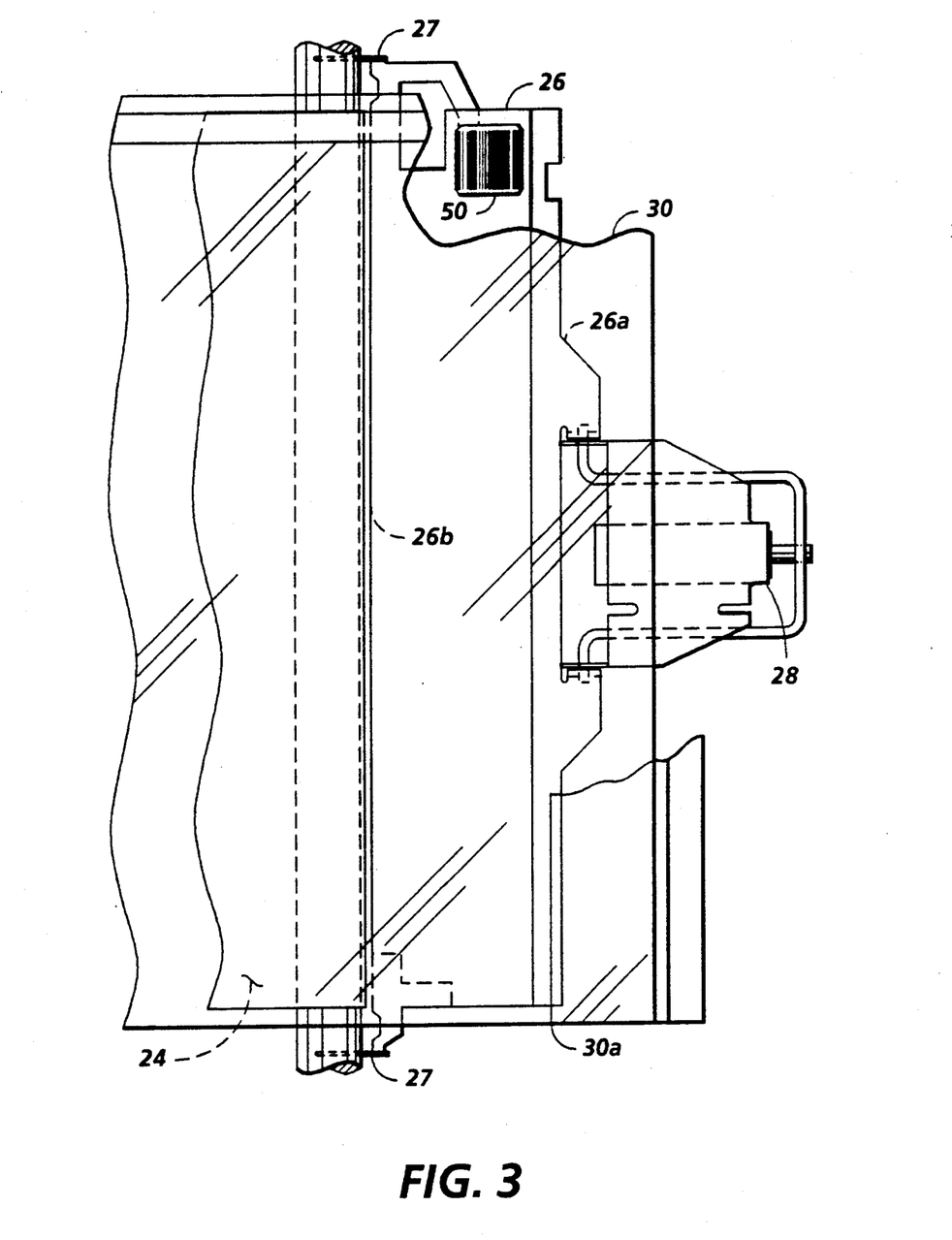
FIG. 3 is a partial bottom view up through the platen.
Figure 4:
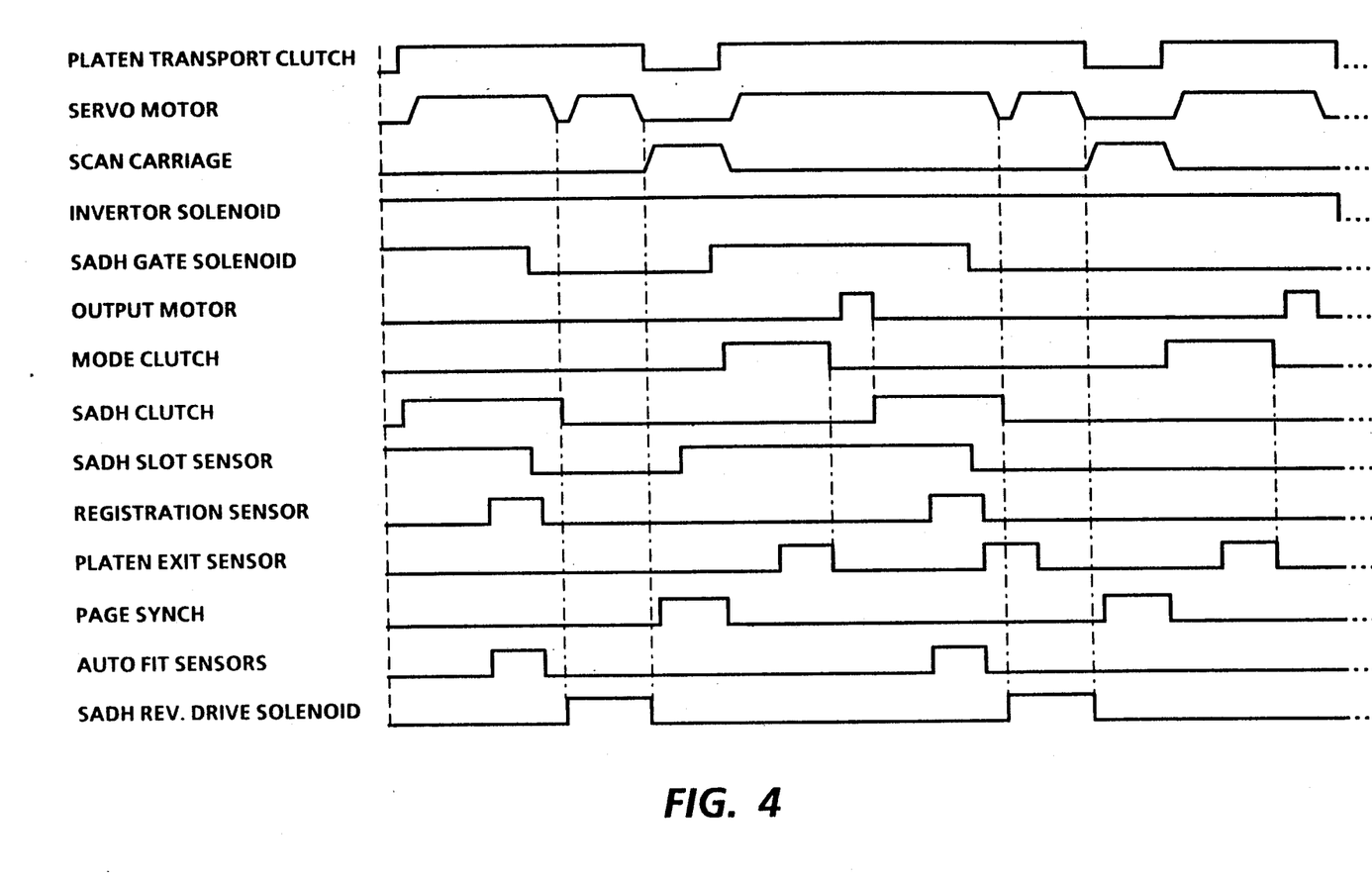
FIG. 4 is an exemplary common time line timing diagram for the operations of the indicted components of the document handler of FIGS. 1 and 2 in feeding and imaging oversize documents.

To assist in this reverse movement of the large document into the registration/copying position, the baffle 26 here provides another, additional, function. The baffle 26 is preferably pivotably mounted relative to the plane of the platen 30 so as to tilt or be slightly liftable at one edge, as described below or in any other suitable manner, for the reverse movement of an oversize document, so that the baffle 26 can function as a gate or stripping finger to assist in the reverse feeding of oversize documents thereunder. One example, of many possible alternatives, of a mechanism for slightly lifting up the downstream end 26b of baffle 26 is by actuation of a solenoid 28 as shown in FIG. 2. The solenoid 28 may be actuated in timed coordination with the other components of the DH 20, upon sensing of an oversized document, as illustrated in FIG. 3. In the example here, the solenoid 28 is connected to the upstream end 26a of the baffle 26, and horizontal movement downstream of the baffle 26 by actuation of the solenoid 28 causes the inclined planar cam surfaces of lift fingers 27 integral this baffle 26 adjacent its downstream end 26b (but outside of the document) to ride up on outside extensions of the upstream roller shaft of the platen transport 24. That correspondingly raises the downstream lip 26b of the baffle 26 away from the platen 30 and above the plane of the platen transport belt 24 lower flight. In that raised position, shown in solid lines vs. phantom in FIG. 2, the baffle lip 26b and associated (now inclined) lower surface of this baffle 26 in effect becomes a stripping gate or deflector to ensure that the previously trailing edge of the now reversed movement large document will back up under, rather than over, the baffle 26.

When the solenoid 28 is not actuated, the baffle 26 is dropped or lowered into its normal generally horizontal position directly overlying the platen 30, by being lowered substantially into that plane. Preferably the lower surface of the baffle 26 is normally allowed to rest directly and flatly on the platen 30 upper surface by gravity when the solenoid is 28 is disengaged. i.e., preferably here the input path of a large document as well as a normal document is above or over the top of the baffle 26, and with the baffle in its lowered position, as previously noted.

The de-actuation of the solenoid 28 to drop the baffle 26 down also helps hold any oversize document area which are may be under the baffle 26 down flat against the platen, thus serving as a platen cover for that portion of the document underlying the baffle. The baffle 26 provides a white background imaging area overlying this area of a large document.

Thus, to summarize the operation, in the case of a detected oversized document, preferably the baffle 26 is initially down for document input, raised and tilted during at least the initial reverse movement of the oversized document at it is being fed into a special registration position partially under the baffle 26, and then the baffle 26 is promptly lowered onto that portion of the oversized document before imaging. If desired, the baffle 26 may again be raised temporarily for the downstream document ejection of the oversize document after imaging, so as not to substantially drag on the document as it is being removed. In contrast, in the case of normal sized documents, the solenoid 28 need never be actuated and the baffle 26 can stay down flat directly on top of the area of the area of the platen it overlies at all times.

An optical bar code test patch 50 on the baffle 26 shown in FIG. 3 is the subject of a copending contemporaneous application Ser. No. 559,020, filed July 27, 1990 of the same assignee, entitled "Scanner Document Absence Code System".

While the embodiment disclosed herein is preferred, it will be appreciated from this teaching that various alternatives, modifications, variations or improvements therein may be made by those skilled in the art, which are intended to be encompassed by the following claims:

What is claimed is:

1. A document feeder for feeding both normal sized and oversized document sheets into imaging positions overlying an imaging platen from a document infeeding entrance position substantially downstream from the effective upstream end of said imaging system, with sensing means for sensing the input of a document which is oversized in the direction of movement thereof, comprising bi-directional platen transport means for feeding normal sized documents unidirectionally downstream from said document infeeding entrance position over said imaging platen into an imaging position overlying said imaging platen, and for initially also so feeding oversized documents downstream, but then, in response to said sensing means sensing that it is an oversized document, and after the trail edge of said oversized document has cleared said document infeeding entrance position, reversing said bi-directional platen transport means to reverse feed said oversized document upstream towards said upstream end of said imaging platen into a special registration and imaging position for oversized documents which is partially overlying at least a portion of said imaging platen between said document infeeding position and said upstream end of said imaging platen.

2. The document feeder of claim 1, wherein said special registration and imaging position of said oversized document is closely adjacent said upstream end of said imaging platen.

3. The document feeder of claim 1, wherein, in response to the completion of imaging of either said normal sized or said oversized document sheets, said bi-directional platen transport means is operated to feed the documents sheets downstream to eject them from the downstream end of said imaging platen.

4. The document feeder of claim 1, wherein a pivotable baffle overlies an area of said imaging platen between said document infeeding entrance position and said upstream end of said imaging platen, which baffle is initially adjacent and generally coplanar said imaging platen for document input through said document infeeding entrance position, and for document imaging, but which baffle is automatically temporarily pivoted upwardly at at least its downstream edge by connecting baffle pivoting means in response to a sensed oversized document during at least said initial reverse movement of said oversized document so that, as said oversized document is being reverse fed upstream towards said upstream end of said imaging platen into said special registration and imaging position, it is fed partially under said baffle, and then said baffle is lowered onto that portion of said oversized document thereunder before its imaging by said baffle pivoting means.

5. The document feeder of claim 4, wherein said pivotable baffle is automatically raised again temporarily by said baffle pivoting means for downstream document ejection of said oversize document after its imaging, so as not to substantially drag on said oversize document as said oversize document is being removed.

6. The document feeder of claim 4, wherein said pivotable baffle is not pivoted for normal sized documents, and said baffle stays down flat directly on top of said area of said platen it overlies at all times for said normal sized documents.

7. A method of feeding both normal sized and oversized documents to be imaged into an imaging position overlying an imaging platen, wherein:
both the normal sized and oversized documents are initially fed onto the imaging platen from a document infeeding entrance position substantially downstream from the upstream end of the imaging platen,
a normal sized document is fed unidirectionally downstream from the document infeeding entrance position over the imaging platen into an imaging position overlying the imaging platen,
oversized documents are initially fed downstream from the document infeeding position over the imaging platen, but then, in response to sensing that it is an oversized document, and after the trail edge of the oversized document has cleared the document infeeding entrance position, the oversized document is then reverse fed upstream towards but not beyond the upstream end of the imaging platen into a special imaging position for oversized documents which is partially overlying at least a portion of the imaging platen between the document infeeding position and the upstream end of the imaging platen.

8. The method of feeding both normal sized and oversized documents to be imaged into an imaging position overlying an imaging platen of claim 7, wherein after the documents are imaged they are fed downstream and ejected from the downstream end of the imaging platen.

9. The method of feeding both normal sized and oversized documents to be imaged into an imaging position overlying an imaging platen of claim 7, wherein in said initial feeding downstream from the document infeeding position over the imaging platen of an oversized document a portion of the oversized document is fed beyond the downstream end of the imaging platen before the oversized document is reverse fed upstream towards the upstream end of the imaging platen.

10. The method of feeding both normal sized and oversized documents to be imaged into an imaging position overlying an imaging platen of claim 7, wherein an oversized document is initially fed in the same manner as a normal size document, until the trailing edge of that document is sensed at a time period following the sensing of the leading edge exceeding a preset time period corresponding to an oversize document.

11. The method of feeding both normal sized and oversized documents to be imaged into an imaging position overlying an imaging platen of claim 7, wherein said document feeding is done by a dual mode automatic document feeder in which normal sized documents are normally loaded into a circulating loop path document set input thereof and oversized documents are loaded into a separate document input with a generally planar document path, but both said document inputs feed documents onto the imaging platen from said common document infeeding entrance position substantially downstream from the upstream end of the imaging platen.

12. The method of feeding both normal sized and oversized documents to be imaged into an imaging position overlying an imaging platen of claim 7, wherein a pivotable baffle overlies an area of the imaging platen between the document infeeding entrance position and the upstream end of the imaging platen, which baffle is initially adjacent and generally coplanar the imaging platen for document input through the document infeeding entrance position, and for document imaging, but which baffle is temporarily pivoted upwardly at at least its downstream edge in response to a detected oversized document during at least the initial reverse movement of the oversized document so that as the oversized document is being reverse fed upstream towards the upstream end of the imaging platen into said special registration position it is fed partially under the baffle, and then the baffle is lowered onto that portion of the oversized document thereunder before its imaging.

13. The method of feeding both normal sized and oversized documents to be imaged into an imaging position overlying an imaging platen of claim 12, wherein the pivotable baffle is again raised temporarily for downstream document ejection of the oversize document after its imaging, so as not to substantially drag on the oversize document as the oversize document is being removed.

14. The method of feeding both normal sized and oversized documents to be imaged into an imaging position overlying an imaging platen of claim 12, wherein the pivotable baffle is not pivoted for normal sized documents, and the baffle stays down flat directly on top of the area of the platen it overlies at all times for normal sized documents.

15. The method of feeding both normal sized and oversized documents to be imaged into an imaging position overlying an imaging platen of claim 7, wherein both normal sized and oversized documents are transported over said imaging platen by a large platen transport and imaging background belt and normal sized documents are imaged fully overlaid by said platen transport belt but oversized documents are imaged only partially overlaid by said platen transport belt.

* * * * *